United States Patent [19]

Aulagner et al.

[11] Patent Number: 4,508,205

[45] Date of Patent: Apr. 2, 1985

[54] DOUBLE CABLE FUNICULAR TRANSPORT DEVICE, LOOPED ON ITSELF AND WITH SPEED VARIATION

[76] Inventors: Michel Aulagner, Paraboin-St Ferreol le Chateau, Near Pont Salomon (Haute Loire); Jean-Paul Jour, La Merlee, 173 Route d'Andrezioeux, St Just St Rambert (Loire), both of France

[21] Appl. No.: 327,333

[22] Filed: Dec. 4, 1981

[51] Int. Cl.³ ............................................. B65G 23/00
[52] U.S. Cl. .................................... 198/334; 198/792; 198/810; 198/856
[58] Field of Search ............... 198/334, 792, 810, 856, 198/813; 104/25

[56] References Cited

U.S. PATENT DOCUMENTS

| | | | |
|---|---|---|---|
| 1,903,488 | 4/1933 | Stibbs | 198/833 |
| 2,609,086 | 9/1952 | McBride et al. | 198/833 |
| 3,565,238 | 2/1971 | Candela | 104/25 |
| 3,583,543 | 6/1971 | Angioletti | 198/334 |
| 4,066,161 | 1/1978 | Michalon et al. | 198/334 |
| 4,284,191 | 8/1981 | Lavau | 198/792 |

FOREIGN PATENT DOCUMENTS 2332761  1/1974  Fed. Rep. of Germany ...... 198/792

Primary Examiner—Joseph E. Valenza
Assistant Examiner—Kyle E. Shane
Attorney, Agent, or Firm—Remy J. VanOphem

[57] ABSTRACT

A funicular type transport device including a variation chain and at least one tractor cable. The variation chain includes a plurality of variation links of variable length forming a continuous loop and a plurality of mobiles interconnected with the plurality of variation links. Each of the plurality of mobile components is provided with an interconnection device selectively engageable with the at least one tractor cable. A sensor measures the tension in the variation chain. A control device responds to the sensor to maintain the tension in the variation chain below a predetermined maximum level.

12 Claims, 26 Drawing Figures

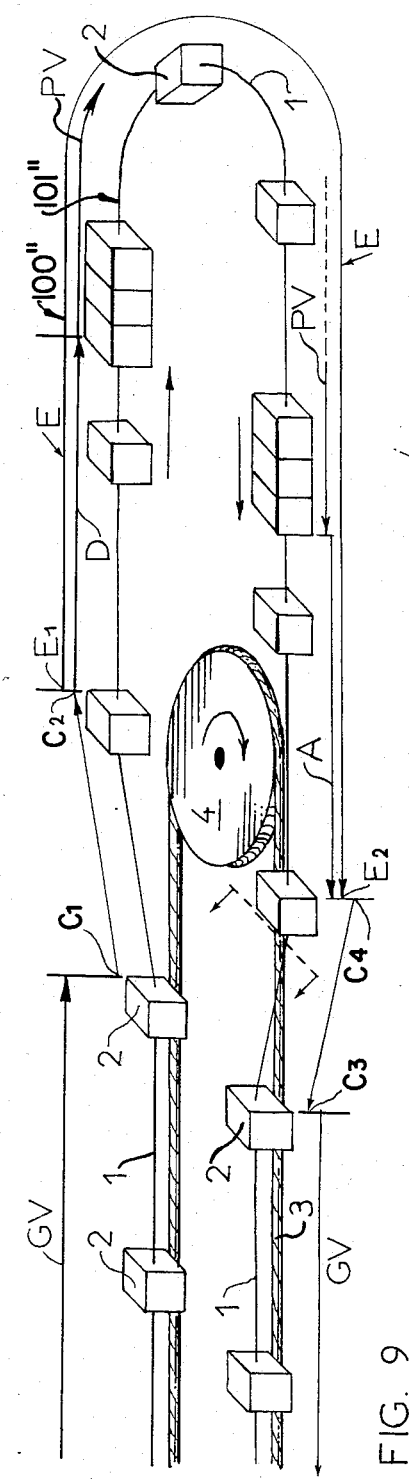
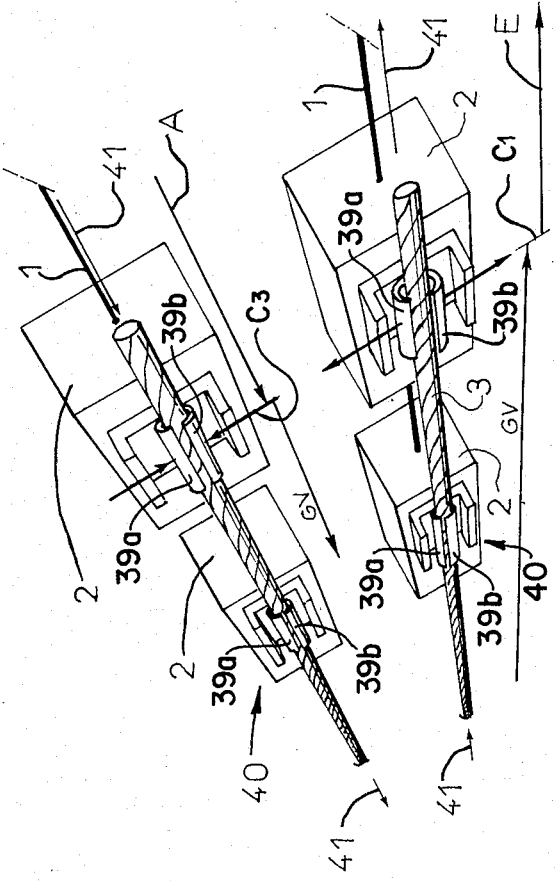
FIG. 9
FIG. 10

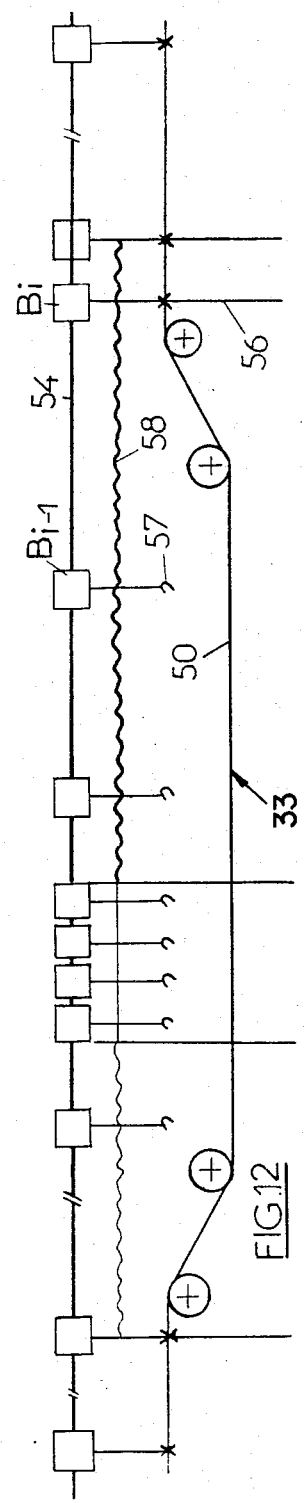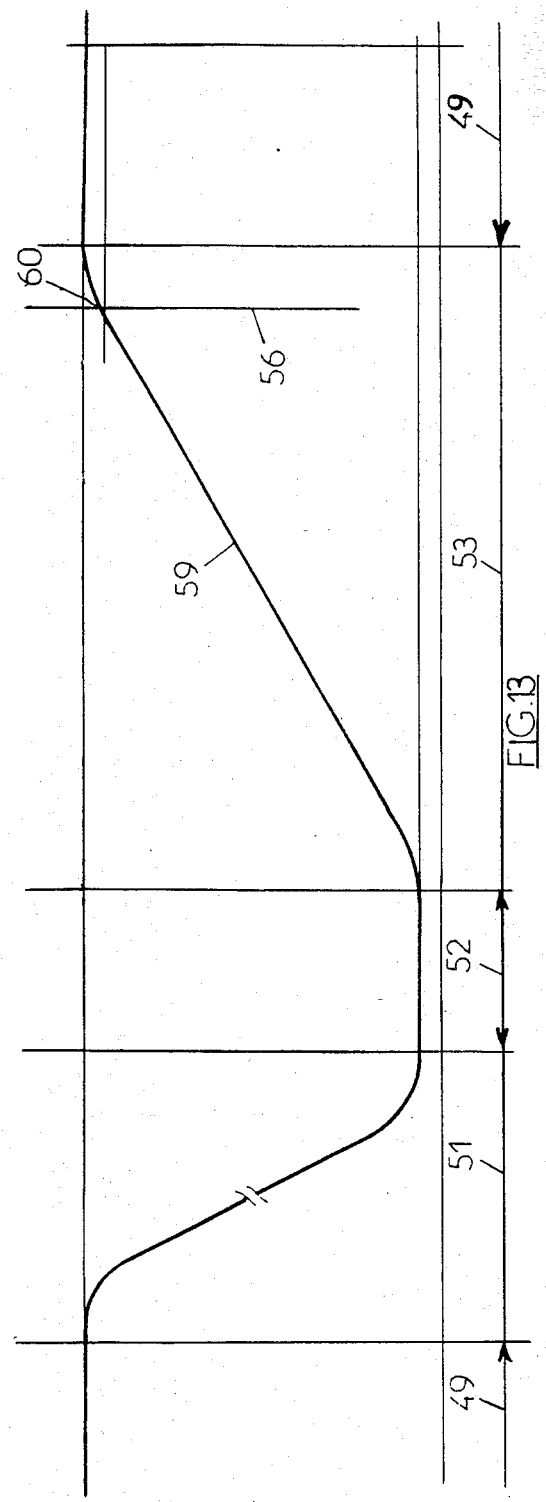
FIG.12
FIG.13

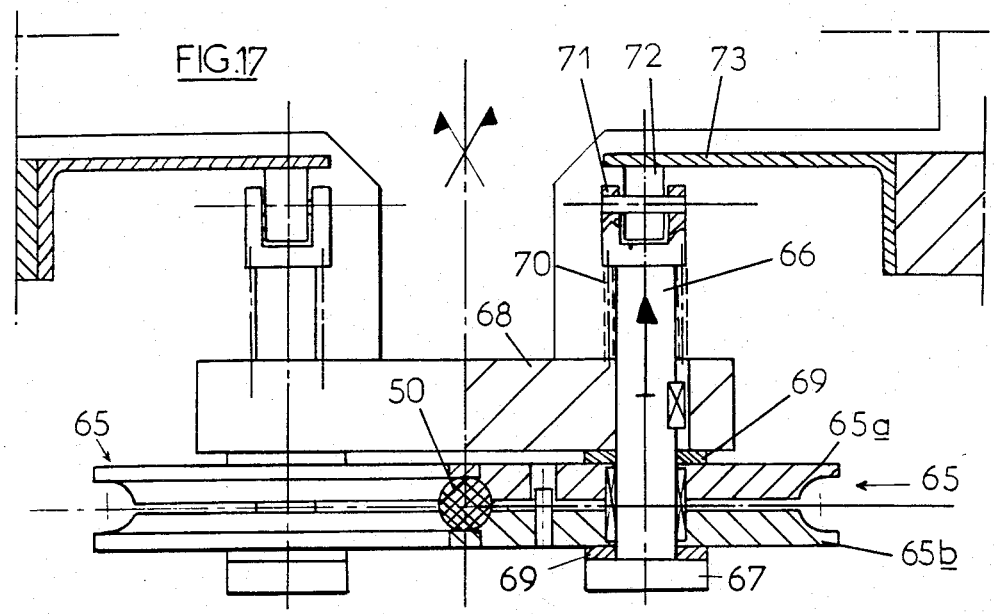
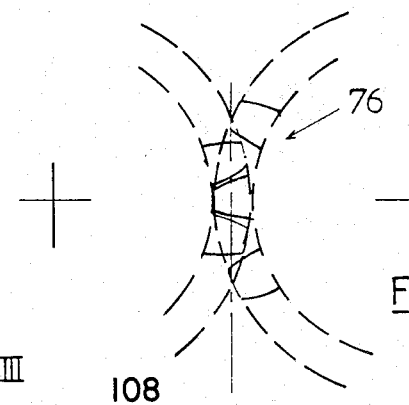
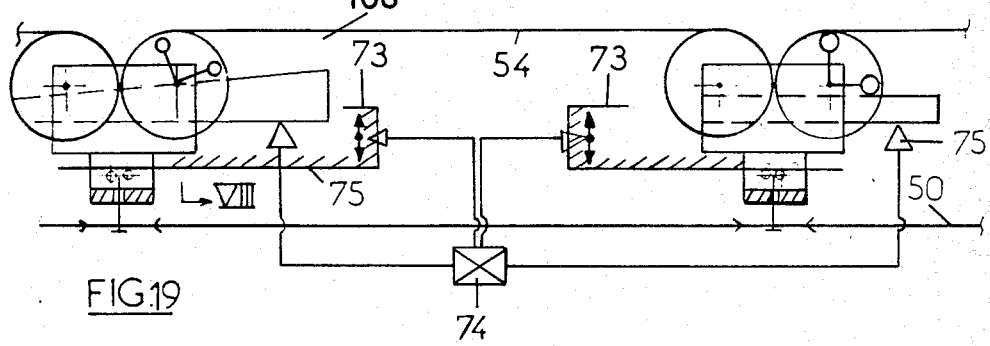

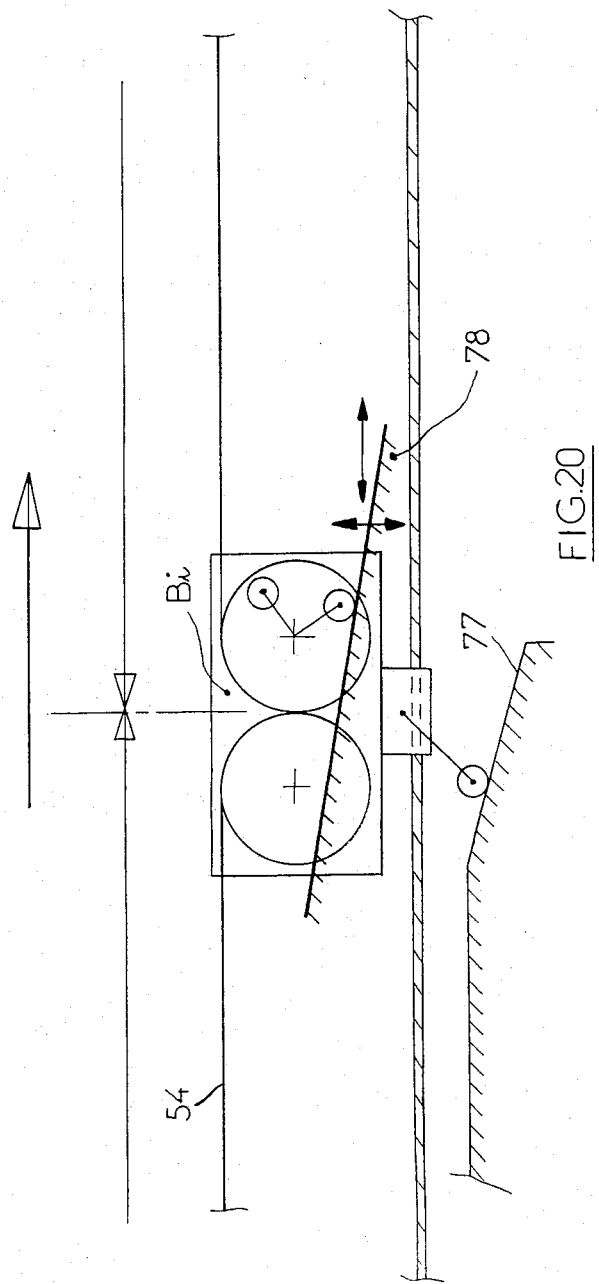

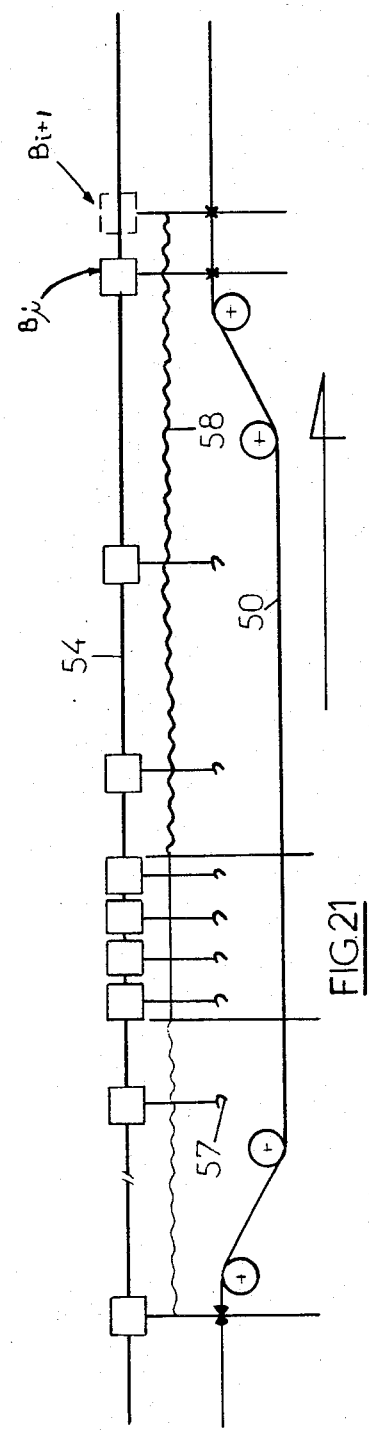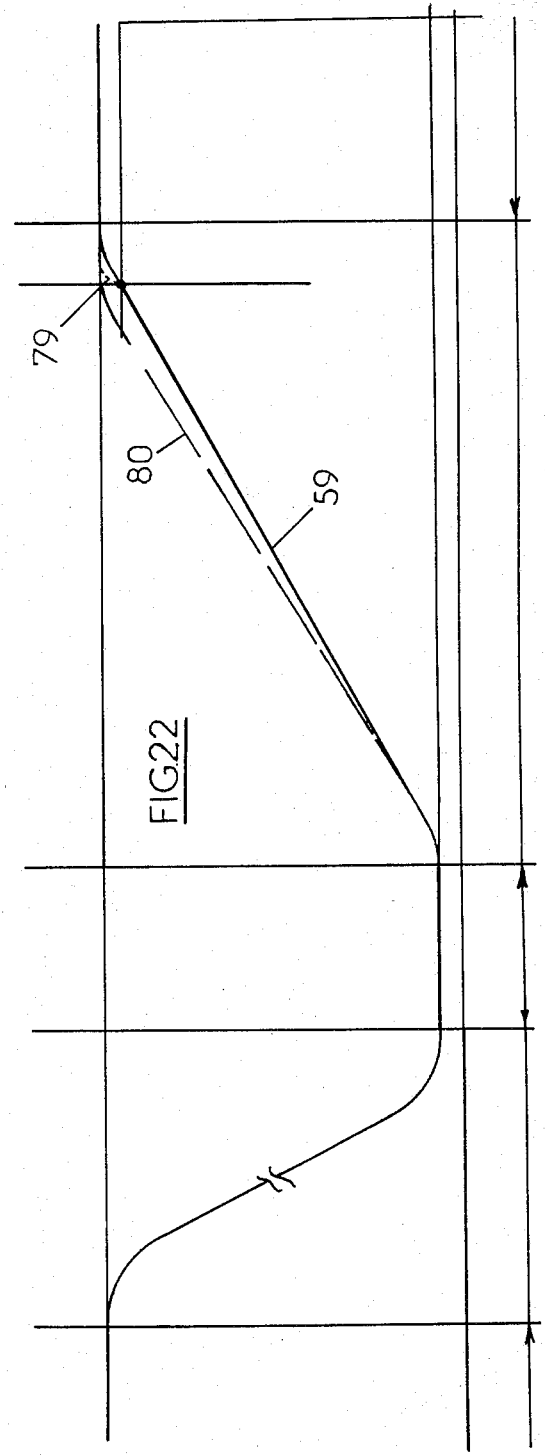

DOUBLE CABLE FUNICULAR TRANSPORT DEVICE, LOOPED ON ITSELF AND WITH SPEED VARIATION

BACKGROUND OF THE PRESENT INVENTION

The present invention pertains to a closed circuit, variable speed transportation device offering all of the advantages of a funicular type system equipped with a kinematic chain.

Popular current transportation systems include a series of mobile components which are rigidly mounted with interconnection devices whose basic kinematics consist of a funicular system, and range from the early single cable tramways to the latest cable cars.

These systems were always impaired by a major disadvantage. The mobile component, that is, the seat, car, or the container, transported by the system whether it be designed for passenger or freight transportation, must necessarily be separated from its link, usually a chain or cable, which represents the kinematic element of the funicular system.

Therefore, upon entering the unloading or deceleration zones, the mobile component leaves a first programmed driving system, before being coupled with a second driving system programmed differently from the first one. For example, the mobile component leaves the cable representing the kinematic element of the funicular system, so as to be hooked to a slower cable, or to slow down by its own means. In terms of mechanics, this type of system is said to include a line kinematics and a stationary kinematics, different from the other one.

Recently, systems have been designed in which the mobile component remains rigidly mounted with the basic kinematic element, that of the funicular device, the latter being able to regulate the speed of the mobile component at the desired points. The mechanical principle of these systems consists of a chain whose link is of variable length and which is represented by a mobile component and a link. The variation of the length of the link provides the speed variation for the mobile component. However, such systems are also limited.

Such systems are limited by the fact that the tensile force applied to the link varies in inverse proportions to the speed. For example, if the speed varies from one unit to twenty units, the low speed tension applied to the link will be twenty times higher than the high speed tension. Therefore, it is necessary to proportion all of the components and the link with reference to low speed tensions, and, therefore, to use overdimensioned parts in high speed areas.

Such systems are further limited by the fact that, in a circuit looped on itself, the speed variation element should transmit the pulling effort to the total length of the circuit in the slow areas as well as in the high speed area.

Such systems are still further limited by the fact that the interconnection device, or tongs, of a mobile component on the chain, should be designed to pull a whole series of mobile components, so that its dimension is proportional to the length of the circuit and to the number of mobiles.

Aside from special applications, such as mountain type cable cars, the funicular type transportation systems could never be developed on a large scale since their disadvantages outweigh their advantages.

When the mobile component switches cable, many problems arise from the shaking motions, acceleration and jerking motions, as well as the lack of safety and reliability stemming from the repeated cable switching of the mobile component.

When a chain type system including links of various lengths is used, the funicular device is both a tractor and a speed regulator. In this case traffic and tension problems are encountered on the link, and drive, traction, and braking problems are also noted.

SUMMARY OF THE INVENTION

A primary object of the present invention is to remedy all previous disadvantages by developing a device which retains the advantages of funicular type kinematics.

Another object of the present invention is to develop regulating means which are able to permanently maintain the tension of the variation chain under a preset limit in the low speed areas.

Still another object of the present invention is to provide means to protect the low speed areas of the variation chain from the high tensions which may result from a significant multiplication of extreme gear ratios, an excessive friction or binding of a bearing, or even from the "hanging" position of the variation chain which hangs freely between two successive mobile components.

The transportation device of the present invention includes a looped closed circuit or rail, or at least a mobile element, so as to constitute a funicular type transportation device. It is characterized by the fact that the mobile component is always rigidly mounted with a first element which controls the speed variation of the mobile component moving along the circuit. This mobile component is also rigidly mounted, in an intermittent fashion, with a second element which moves along a looped rail, at constant high speed, in order to allow for the traction of the mobile component or a series of mobile components which are all permanently mounted with the first element.

According to another feature of the present invention, the speed variation element consists of a device representing a chain with links of variable lengths. The variable length of the links controls the spacing of two successive mobile components. This device thus maintains the predetermined motion of the various mobile components, whereas this chain transmits the tension required to pull the mobile components throughout the variable speed zone, this chain no longer driving the system.

According to another feature of the present invention, the second element, or drive-tractor element, moves at a constant speed which is equal to the highest speed of the mobile components of the system. The drive-tractor element practically sustains alone the pulling forces, braking forces, and all other mechanical forces, whereas its high speed displacement along a looped circuit limits the amount of tension applied to the components thereof. The drive-tractor element may consist of a tractor cable or a series of tractor cables, each one looped on itself, and leaving the speed variation zones, where the mobile components are separated from the drive-tractor element, completely free so as to relieve the system.

According to another feature of the present invention, the system includes a regulating device in each speed variation zone. The regulating device is the same for all tractor cables and prevents any excessive tension to affect the variation chain, by controlling the drive components of the drive-tractor element.

According to another feature of the present invention, the safety and reliability of the system are maximized. The mobile components are, therefore, never released, whereas the speed variations, which occur when mobile components arrive and depart from the station, are obtained through an interface between the elements of a mobile component and the rails of the fixed structure of the system. It is, therefore, possible to reduce the number of auxiliary safety devices.

According to another feature of the present invention, the tension is regulated by a device which senses the force experienced by the fixed rail upon the occurrence of any speed variation and, therefore, detects the variation of the tension within the variation chain.

According to another feature of the present invention, the connection between a mobile component and a tractor link of the tractor cable may consist of tongs, or a similar friction device, or of a series of control elements rigidly mounted with the tractor link.

According to another feature of the present invention, the variation chain has links of variable lengths which consist either of a series of cable segments attached to two successive spool type bogies, or alternatively of a chain including deformable links, and with a constant perimeter defined by a closed loop.

According to another feature of the present invention, the elements which regulate the tension within the variation chain react, for a given station, within the sole operation of that station. They do not interface with the drive motors of the tractor cable nor do they affect their speed. The term "station", as used herein, describes the zone covered by a mobile component from the time when it leaves the tractor cable to the time when it meets the tractor cable.

According to another feature of the present invention, an override device is provided to control the variation elements from the position of the meeting point in response to the tension sensed in a variation link of the variation chain at a given station.

According to another feature of the present invention, the override device regulates the position of a control rail with reference to the delay affecting the departure of the mobile components from the station in the following case. In this case, the connection of a mobile component on the tractor cable consists of a friction type pair of tongs which may latch onto the tractor cable by means of a return spring, or leave that same tractor cable by an opening operation controlled by a rail.

According to another feature of the present invention, the variation chain consists of a plurality of variation links including flexible cable raveling or unraveling reels. The assembly is designed in such a way that the normal engagement of the tractor cable by the tongs of each mobile component takes place at a predetermined location. The predetermined location is located before the end of the unraveling control rails, so that the effective location of engagement of the tractor cable by the tongs could move on either side of the predetermined position.

According to a variation of the present invention, the regulating means are able to induce a variation of the speed within the given station.

According to another feature of the present invention, the variation chain has variation links including flexible cable raveling or unraveling reels. The means used to induce the speed variation affects the position of the unraveling control cable length rails.

According to another feature of the present invention, an elastic component is positioned under part of the variation chain, separating to successive mobile components.

According to another feature of the present invention, each elastic component interfaces with a ratchet type device which only allows the elastic component to be deflected in the speed variation zone and in the low speed zone of the stations.

According to another variation of the present invention, each mobile component includes two connecting components interfacing with the tractor cable. The first connecting component of the two connecting components connects the mobile component with the tractor cable in the high speed zone, and the second connecting component of the two connecting components performs a driving function by a variable friction effect.

According to another feature of the present invention, the second connecting component includes, for each mobile component, a pair of clamping pulleys holding the tractor cable between themselves. Each clamping pulley consists of two half pulleys which are complementary and mounted in such a way as to rotate on a shaft rigidly mounted with the mobile component. On the shaft, these two half pulleys are stacked with friction discs. Adequate elements are provided to clamp the stacking of each shaft to a variable degree depending on the tension within the variation links of the variation chain.

According to another feature of the present invention, safety systems are provided so that a decelerating mobile component always pulls on the upstream cable, and never on the downstream cable, beyond a predetermined traction force. In contrast, an accelerating mobile component always pulls on its downstream cable, but never on its upstream cable beyond a predetermined traction force.

According to another feature of the present invention, each decelerating zone is slanted downhill.

According to a variation of the present invention, the safety systems consist of an increase in the inertia of the mobile components, by merely increasing their mass, or by means of inertial wheels which are rotatably mounted to the rolling elements.

According to another variation of the present invention, the safety systems consist of systems which can push the decelerating mobile components in the direction of the displacement. The force of the safety systems is sufficient to balance all possible accidental and incidental braking actions which may occur.

According to another feature of the present invention, the safety systems consist of linear electrical motors having spools located in a fixed portion. An armature is located inside the mobile component.

These and many other objects, features and advantages of the present invention will become apparent to those skilled in the art upon reading the following detailed description in conjunction with the drawings appended hereto.

BRIEF DESCRIPTION OF THE DRAWINGS

FIGS. 9 and 10 are the respective elevations of another variation of the circuit as seen from the side and from beneath (following arrow F);

FIG. 12 is another partial side view of the transportation device of FIG. 11;

FIG. 13 is a graphical view showing the speed diagram of the transportation device of FIG. 12;

FIG. 19 is another partial side view of the transportation device according to another variation;

FIG. 17 is a schematic sectional view taken along line VIII—VIII of FIG. 19;

FIG. 18 is a partial top view of a pair of clamping pulleys illustrated in FIG. 17;

FIGS. 20 and 21 are side views of the transportation device of the present invention according to other variations;

FIG. 22 is a graphical view of the speed diagram of the transportation device of FIG. 21.

DETAILED DESCRIPTION OF THE PREFERRED EMBODIMENTS

Figure 1:
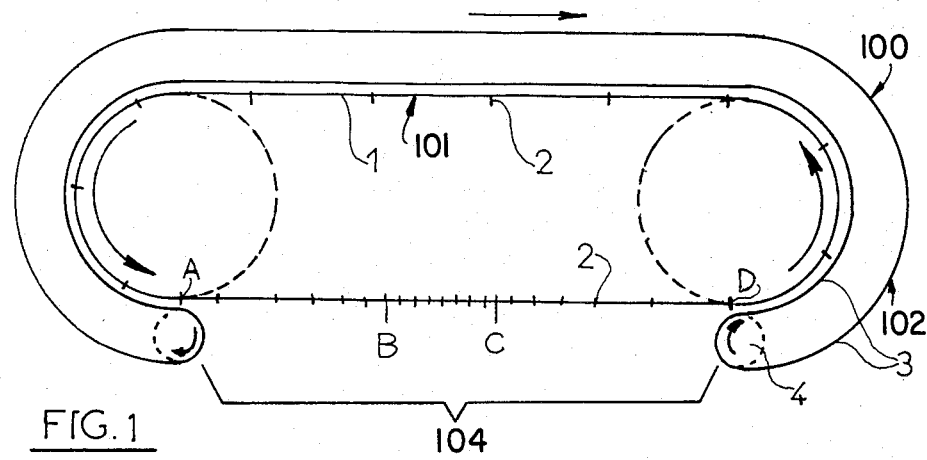
FIG. 1 is a schematic view of a transportation device according to the present invention, the transportation device including a tractor assembly, as well as a variation chain so as to provide a funicular transportation means encompassing circuits that are looped on themselves.

FIG. 1 illustrates a transportation device 100 using a funicular type kinematics. A variation chain 101 including variation links 1 of variable lengths is looped on itself. Each variation link 1 carries a mobile component 2 which is permanently coupled with the variation chain 101. The transportation device 100 is provided with a tractor assembly 102, consisting, for example, of a cable 3, looped on itself and driven at a constant high speed, equal to the highest speed of the mobile components 2, by a motor 4 of any known type.

The transportation device 100 illustrated in FIG. 1 includes only one high speed area extending counterclockwise from point D to point A and only one non-driven zone 104. The non-driven zone 104 includes a decelerating portion AB, a low speed or stop portion BC and an accelerating portion CD.

Figure 2:
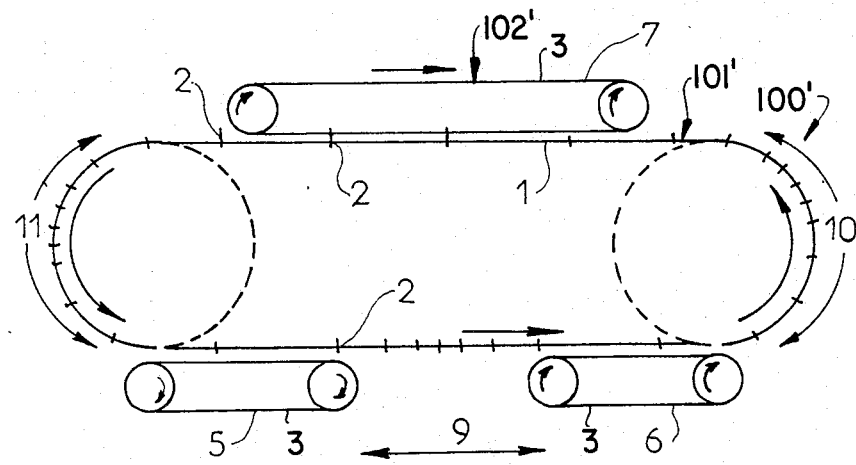
FIG. 2 is a schematic view similar to FIG. 1 but illustrating a variation of the transportation device thereof.

FIG. 2 shows a transportation device 100′ whose variation chain 101′ interfaces with several portions 5, 6 and 7 of the tractor assembly 102′, each of the portions being looped on itself. The portions 5, 6 and 7 of the tractor assembly 102′ leave the free intervals between themselves, these intervals corresponding to the mobile speed variations in non-driven zones 9, 10, and 11 interposed the portions 5, 6 and 7.

In both cases described above, the cables of the tractor assemblies 102 and 102′ are stretched in the driven zones only. The mobile components 2 are then coupled with both the variation chain 101 or 101′ and the tractor assembly 102 or 102′. In contrast, in the stationary zones and speed zones, the mobile components 2 are disconnected from the tractor assemblies 102 or 102′, as shown in FIGS. 3 through 5 and 10, while they remain coupled with the variation chain 101 or 101′.

The transportation device 100 or 100′ according to the present invention offers a substantial advantage over prior art devices. The driving force or the traction force is simultaneously applied to each one of the mobile components 2 located in the high speed zones. This traction force is produced by the tractor cable 3 of the tractor assembly 102 or 102′, rather than by the variation links of the variation chain 101 or 101′. It is, therefore, possible to use interchangeable connections between the variation links 1. In particular, it is not required that the connections depend on the length of the closed circuit or be designed for low speed tensions, as is the case with prior art devices.

Figure 3:
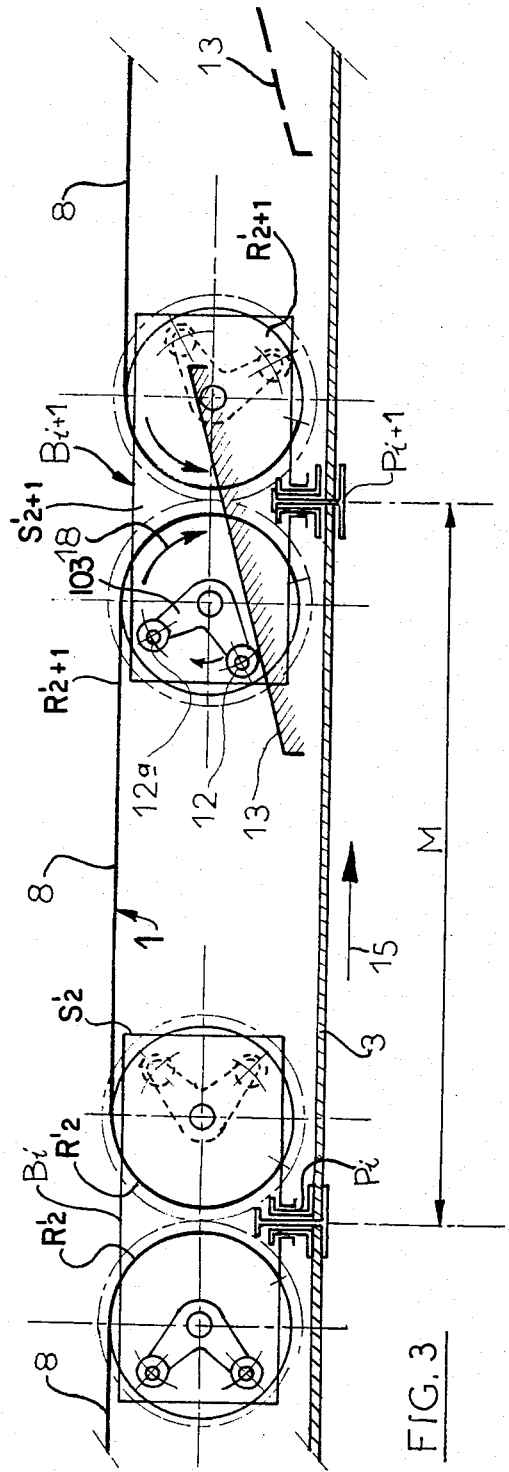
FIG. 3 is an enlarged side view of a portion of the transportation device of FIG. 1 or FIG. 2 including mobile components equipped with reels.

FIG. 3 shows a portion of the funicular assembly of transportation device 100 or 100′ whose successive mobile components 2 consist of bogies $B_i$, $B_{i+1}$, etc. Each bogie $B_i$ is provided with a support $S_i$, an upstream reel $R_i$ rotatably mounted to the support $S_i$, and a downstream reel $R_i'$ rotatably mounted to the support $S_i$ downstream of the upstream reel $R_i$, as defined by the direction of motion of the tractor cable 3, indicated by arrow 15. Each upstream bogie $B_i$ is connected to the previous downstream bogie $B_{i+1}$ by a variation link 1 which consists of a variation cable 8 which coils on the respective downstream and upstream reels $R_i$ and $R_{i+1}$ of the upstream and downstream bogies $B_i$ and $B_{i+1}$. Furthermore, each upstream or downstream reel $R_i$ or $R_i'$ includes a rotation control device consisting of a support plate 103 designed for rollers 12 and 12a which stop against a ramp 13. The ramp 13 is rigidly mounted with the fixed structure of the transportation device 100 or 100′ and is located in the non-driven zones 9, 10, 11 or 104.

FIG. 3 depicts the entrance of the bogie $B_{i+1}$ to a non-driven zone. Each bogie $B_i$ and $B_{i+1}$ is equipped with tongs $P_i$ and $P_{i+1}$ for its intermittent friction type connection with the tractor cable 3. Each bogie $B_i$ and $B_{i+1}$ moves at a constant high speed. Each bogie $B_i$ and $B_{i+1}$ is controllably coupled, by its tongs $P_i$ and $P_{i+1}$ with the tractor cable 3, which moves at a constant high speed. The downstream bogie $B_{i+1}$ is illustrated as it enters a non-driven zone. The tongs $P_{i+1}$ of the downstream bogie $B_{i+1}$ are open under the action of a control mechanism, not illustrated, which can be of any known type, located in the entrance to the non-driven zone. The bogie $B_{i+1}$ is disconnected from the tractor cable 3, but it remains coupled to a funicular assembly, consisting of the series of bogies, $B_i$, $B_{i+1}$, etc., by the variation cable 8.

In the non-driven zones, the upstream reel $R_{i+1}$ of the downstream bogie $B_{i+1}$ is driven in rotation, as indicated by arrow 18, by the action of the ramps 13 on the rollers 12 and 12a. The upstream reel $R_{i+1}$ coils the variation cable 8 on itself. The length M of the variation link 1, defined by the distance between adjacent tongs $P_i$ and $P_{i+1}$, decreases.

In the system illustrated in FIG. 3, the intermeshed upstream and downstream reels $R_i$, $R_i'$, $R_{i+1}$ and $R_{i+1}'$ of the bogies $B_i$ and $B_{i+1}$ have been represented. Furthermore, the tractor cable 3 moves throughout the length of the line. The tractor cable 3 may leave the speed variation zone disengaged from the variation cable 8.

Figure 4:
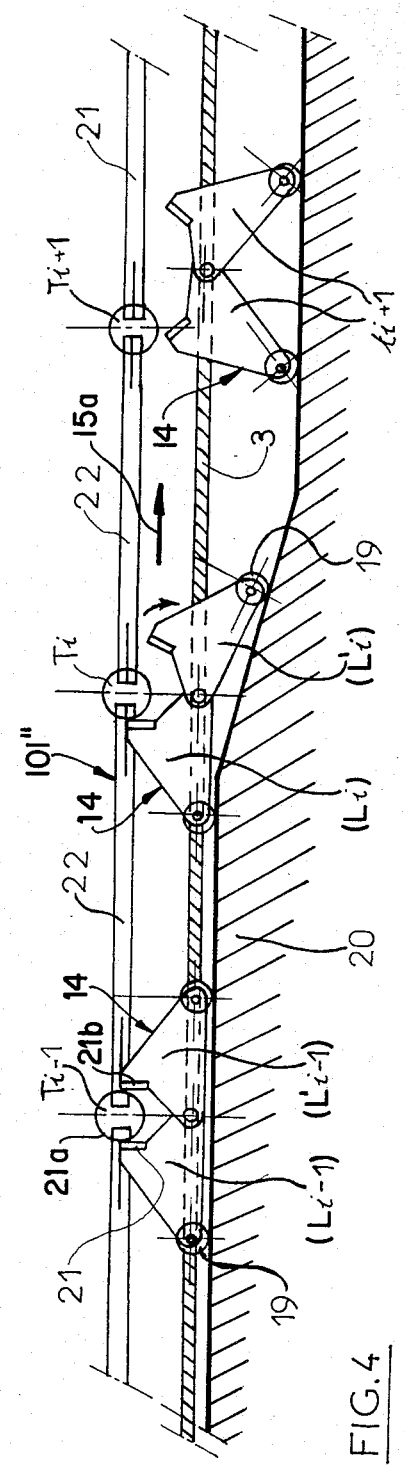
FIG. 4 is a sectional view taken along line V—V of FIG. 5 illustrating an alternate funicular assembly of a deformable links type.
Figure 5:
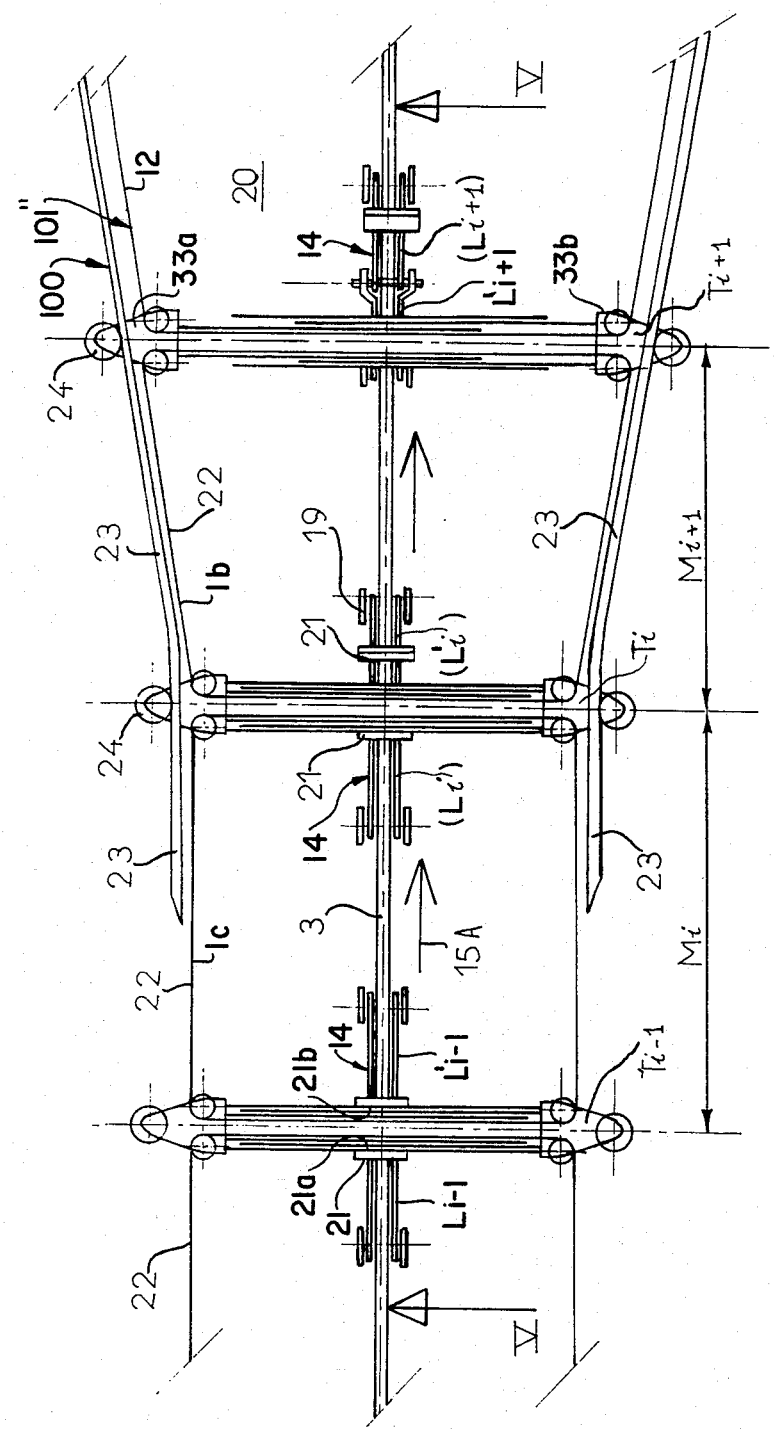
FIG. 5 is a top view of the funicular assembly illustrated in FIG. 4.

An alternative funicular assembly is illustrated in FIGS. 4 and 5. The tractor cable 3 moves at a constant high speed, from the left to the right, as viewed in these Figures. The tractor cable 3 carries a series of equally spaced clamping subassemblies 14 including pivoting lugs $L_i$ and $L_i'$ equipped with rollers 19 to enable them to slide or roll along control rails 20 of the fixed structure of the transportation device 100 or 100'. The lugs $L_i$ and $L_i'$ also include flanges 21 defining contact surfaces 21a and 21b, which constitute a series of positive connecting means between the tractor cable 3 and the variation chain 101', consisting of a deformable links type chain having links $M_i$ and $M_{i+1}$, as illustrated in FIG. 3. The mobile components 2 of the funicular assembly consists of cross-bars $T_i$ which support a series of return rollers for variation cables or bands 22 which are looped on themselves. These variation cables or bands 22 have a constant length. As shown in FIG. 5, the cross-bars $T_i$ are also equipped with means allowing contact with a pair of side rails 23 located in the non-driven zones 9, 10, 11, and 104. Each of the side rails 23 cooperate with adjacent cross-bars, such as cross-bars $T_i$ and $T_{i+1}$, to define a variation link 1a, 1b or 1c of the variation chain 101'', of lengths $M_i$ or $M_{i+1}$.

FIGS. 4 and 5 illustrate a decelerating zone, that is an upstream end of a non-driven zone. The cross-bars $T_{i-1}$ and $T_i$ move at a high constant speed, in the direction of arrow 15A. They are removably coupled by the lugs $L_{i-1}$ and $L_{i-1}'$ to the tractor cable 3, which moves at constant speed. The downstream cross-bar $T_{1+1}$ in the drawing has already entered its decelerating phase since the lugs $L_{i+1}$ and $L_{i+1}'$ are open. The cross-bar $T_{i+1}$ is, therefore, separated from the tractor cable 3. The two opposite flanges 33a and 33b are spread under the action of the side rails 23 which rollers of the cross-bar $T_{i+1}$ rotatably engage. The downstream cross-bar $T_{i+1}$ remains coupled with the funicular assembly of the series of cross-bars by the variation cable or band 22 which defines the variation 1b of length $M_i$. In the zone represented in FIGS 4 and 5, the variation link 1a of width $M_{i+1}$ deforms itself by becoming wider, and, therefore, shorter, thus slowing down the upstream cross-bar $T_{i+1}$.

The above described transportation device 100'' offers several apparent advantages.

Whether the mobile component 2 is coupled or not to the tractor cable 3 of the tractor assembly 102 or 102', and whether it is moving at a constant or a variable speed or at a high or a low speed, it always remains coupled to a chain assembly including variation links 1 of variable length, and looped on itself. The chain assembly immutably predetermines its spacing with reference to the mobile component 2 which precedes it and with the one that follows it. The pace of the transportation device is, thus, automatically set, any individual regulation of the speed or of the link elongation, thus, becoming unnecessary. Thus, the chain assembly defines a preprogrammed rule of speed for the variation chain 101 or 101'.

Since the mobile component 2 is never released by the variation chain 101 or 101', the safety devices may be kept to a minimum.

All forces caused by the traction, the braking, the emergency stop or the regulation of speed are only applied to the tractor assembly 102 or 102', so that the components of the variation chain 101, consisting of variation links 1 of variable length do not have to be overdimensioned, as in prior art devices. Further, the variation chain 101, 101', or 101'' only transmits the tension required to pull the mobile components 2 in the non-driven zones. The tension force is applied, in the driven zones, to the tractor cable 3 of the tractor assembly 102, which is looped on itself and which could be easily overdimensioned.

The novel funicular kinematic system of the present invention does not lead to any power or heat exchange with the outside, with the exception of friction. The funicular kinematic system, looped on itself, retains the energy required for the deceleration of the mobile components 2 regardless of their mass and their speed, with the exception of the losses resulting from the friction. Likewise, it is able to accelerate and then decelerate any given mass, without any energy loss other than that resulting from the friction, the only limitation on this statement being that the mass be removed from the system at the same speed as the one at which it has been loaded to the system.

The funicular kinematic system, looped on itself, constitutes a transportation device observing a predetermined rule of speed at every point of the loop. The transportation device cyclically follows the same steps. A transportation device is thus obtained, in which no incidental malfunction can occur, except for the breakage of a mechanical component or a personal accident.

Each one of the chain elements is driven, and a single pair of tongs only pulls the mobile component to which it is attached.

Figure 6:
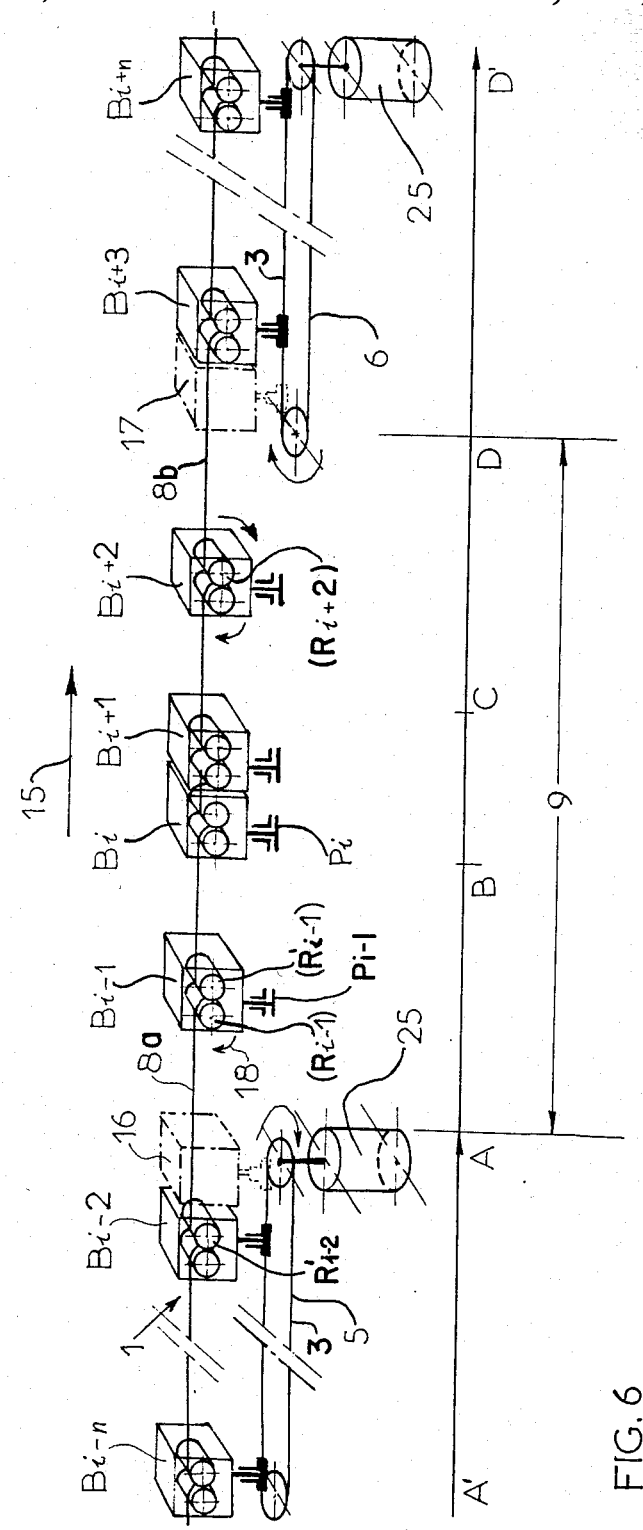
FIG. 6 is a schematic view illustrating the general arrangement of the funicular device.

FIG. 6 shows the general arrangement of a funicular kinematic system according to the present invention. The mobile components move from the left to the right, as indicated by arrow 15, and are represented by a series of bogies $B_i$ as described above, which are rigidly mounted to the variation chain 1. In this example of structure the consecutive mobile components 2 are separated from the tractor cables 3 or the portions 5 and 6 of the tractor assembly in the non-driven zone. The tractor cables 3 of the portions 5 and 6 of the tractor assembly are each looped on itself. The tractor cables 3 are driven by any type of known motor assembly 25 at a constant high speed. They only operate in the zones A'A and DD' where the variation chain is subjected to a high speed displacement by the tractor cable 3, and maintain free the non-driven zone 9 therebetween. The nondriven zone 9 includes three smaller zones, that is a decelerating zone AB, a low speed or stop zone BC and an accelerating zone CD.

At the entrance to the non-driven zone 9, a releasing drive 16 is provided for the tongs $P_i$. A closing device is provided for the tongs $P_i$ at the exit of the non-driven zone 9.

Throughout the circuit portion illustrated in FIG. 6, the transportation device operates in the following manner. The bogies $B_{i-n}$ and $B_{i-2}$, still in the high speed zone A'A, are rigidly mounted with the tractor cable 3 of the portion 5. Upon passing by the releasing device 16, the bogie $B_{i-1}$ is released from the tractor cable 3, as the tongs $P_{i-1}$ open, and enters in the decelerating section AB. The ramp 13 and rollers 12 of the bogie $9_{i-1}$ induce the rotation of the upstream rail $R_{i-a}$ in the direction of the arrow 18 in FIG. 3. The upstream reel $R_{i-1}$ coils the variation cable 8a, and the distance between the upstream reel $R_{i-1}$ of the bogie $B_{i-1}$ and the downstream reel $R_{i-2}'$ of the bogie $B_{i-2}$ decreases, beginning the decelerating phase. The bogies $B_i$ and $B_{i+1}$ are located on the low speed or stop zone BC. The bogie $B_{i+2}$ is represented during its accelerating phase, its downstream reel $R_{i+2}'$ being connected by the variation cable 8b to the previous bogie $B_{i+3}$, then uncoils the variation cable under the control of the ramps 13. The bogies $B_{i+3}$, $B_{i+n}$, having passed through the closing zone 17 and resumed the high speed displacement of the tractor cable 3 of the portion 6 of the tractor assembly, are now connected again with the latter.

Therefore, the tractor assembly 102 is not continuous, but consists of a series of tractor cables 3 which are looped on themselves. The main advantage of this system is to avoid an abnormal tension increase in the variation cables 8, 8a, and 8b, at low speed. Therefore, the tractor cable 3 is interrupted as soon as the mobile component 2 is disconnected from it. It may happen that the tongs $P_i$, connecting the mobile components with the tractor cables 3 slip. Therefore, the tongs $P_i$ induce a certain amount of tension in the variation chain 8 at high speed, but without any major inconvenience. Indeed, this tension occurring in the high speed zones A'A and DD' is absorbed by the tractor cables 3.

Figure 7:
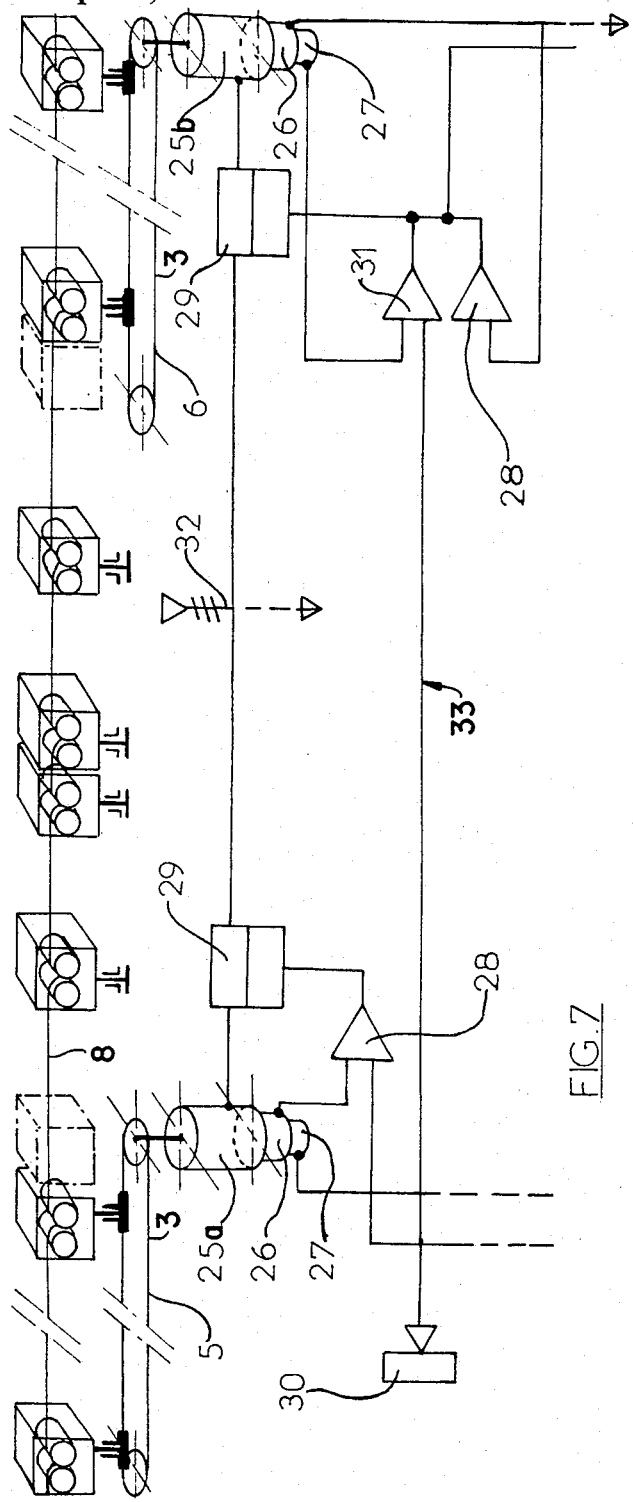
FIG. 7 is a schematic view showing a device used to sense and regulate the tension in the variation link.

If necessary, the funicular system illustrated in FIG. 6 includes a simple regulating device 33, as shown in FIG. 7. The regulating device 33 is designed to interconnect the motor assembly 25 of each one of the tractor cables 3 which are looped on themselves. The regulating device 33, is also designed to individually control these components so that the tension within the variation cable 8 never exceeds a preselected value whenever the variation cable enters a decelerating zone. The preselected value is generally a very low one. Assuming that the tension is F, the tension at a K times smaller speed will never exceed the value KF, which remains small.

FIG. 7 illustrates a speed variation zone between two high speed displacement zones of the funicular system, and is similar to the example shown in FIG. 6. The motor assemblies 25a and 25b of the tractor cables 3 of the portions 5 and 6 of the tractor assembly 102 are interconnected by means of a symmetrical regulating device 33. The symmetrical regulating device 33 includes, for each motor assembly 25a and 25b a tachometric generator 26, an angular displacement measuring device 27, a speed override device 28, and a four quadrant speed regulator 29, which includes the motor assembly 25a or 25b.

The symmetrical regulating device 33 also includes a rotating speed indicator 30, an angular position override device 31, and a feeding system 32.

The symmetrical device 33 is designed to regulate the tension within the variation cable 8a or 8b. This tension is measured by the measuring device illustrated in FIG. 8. The bogie $B_i$, in the stationary or low speed zone, for example, zone BC of FIG. 6, is both connected with the following and the previous bogies $B_{i+1}$ and $B_{i-1}$ by the variation cable 8a or 8b. The variation cables 8a and 8b coil around the reels $R_i$ and $R_i'$, respectively, which rotate together with the rollers 12 and 12a, in contact with the control rail 13a which is part of the fixed structure of the system that includes the ramp 13 of FIG. 2. The tension applied on the varition cables 8a and 8b induces a torque in the reel $R_i$ and $R_i'$. This torque is absorbed by the contact of the roller 12 on the control rail 13a. Therefore, the tension measured within the variation cable 8a or 8b will be sensed, measured and regulated by the measurement of the force applied to the control rail 13a. This measurement may be made by a regular device which may be sensor-receivers 35a or 35b. As soon as the force applied to the control rail 13a exceeds a preselected value, the symmetrical regulating system, depicted in FIG. 7, gives the order to the drive component of the tractor cable 3 of the portion 5 of the tractor assembly, at the entrance of AB to accelerate during a given period, or to accomplish an additional rotation, in order to bring the tension force below the preselected value.

Figure 8:
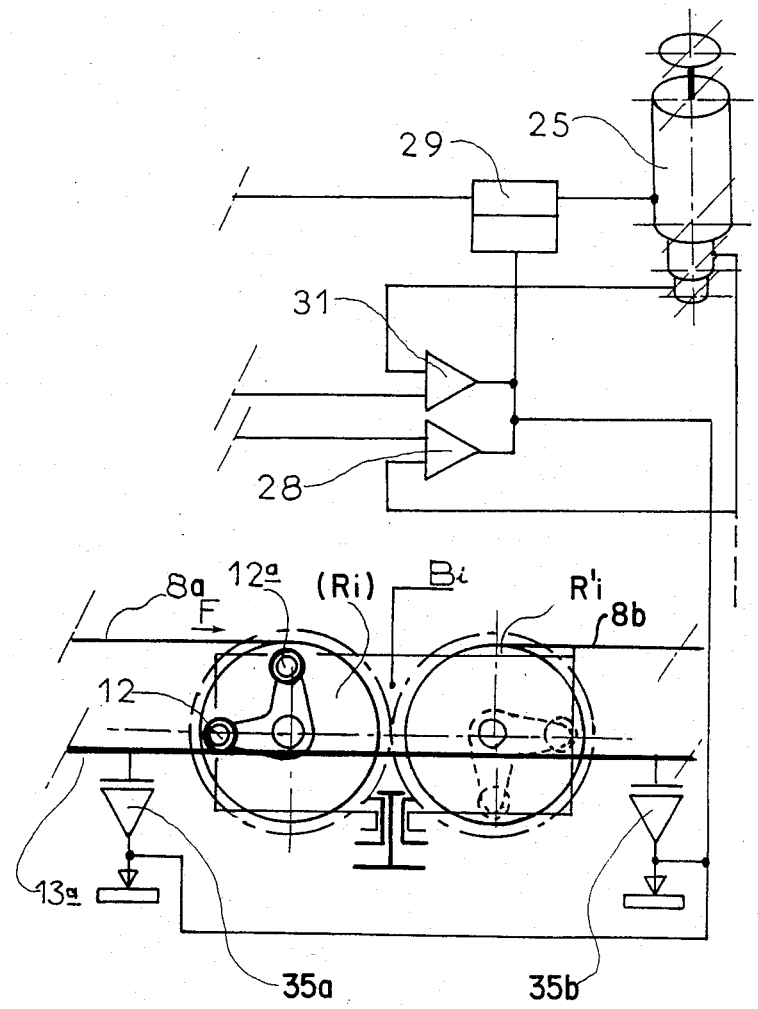
FIG. 8 is a schematic diagrammatic view which illustrates the regulation obtained by measuring the effort applied by a mobile component on a fixed rail of the structure.

Clearly, as illustrated in FIGS. 7 and 8, the symmetrical regulating device 33 reacts on the motor assembly 25b of the portion 6 of the tractor assembly, upon its leaving the acceleration zone. This is desirable for two reasons.

First, it is obvious that the tension cannot be regulated by increasing the speed of the tractor cable 3 of the portion 5, since the speed of the overall system would then be increased. Therefore, there should be a necessary interconnection between the motor assemblies 25a and 25b, respectively, of the portions 5 and 6 of the tractor assembly.

Second, the transportation device should include all emergency stop and braking means, in accordance with the effective government regulations and commercial standards. In order to avoid a tension increase in the variation links 1 of the variation chain 101 or 101' at low speed, the symmetrical regulating device 33 should balance the braking action between the portions 5 and 6 of the tractor assembly which, therefore, absorb almost all of the braking force.

Due to the proper arrangement of the tractor link loops, the variation links 1 of the variation chain 101 or 101' will not be subjected to any excessive tension, from the initial starting of the system to its normal operation, as well as during an emergency braking operation.

It will be appreciated that the present invention includes minor changes made to the above described funicular system, or to the variation link if the symmetrical regulation is effected by an interconnection between the looped drive components of the tractor assembly.

FIGS. 9 and 10 illustrate another variation of the transportation device 100" whereby the stationary zones are provided at the end of the loop of the tractor cable 3. In the end zones E, the variation chain 101" follows a path $E_1E_2$ which spreads significantly apart from that of the tractor cable 3, returned by the drive wheel 4. The transportation device 100" is similar to the one illustrated in FIG. 1, except that the stationary zones are located at the ends of the loop.

In accordance with the present invention, the tractor cable 3 disengages from the variation links 1 of the variation chain 101" in the end zone E, which represents the speed variation zone of the mobile components 2, which are each rigidly mounted to one variation link 1 of the variation chain 101". Each mobile component 2 is equipped with a tongs type device 40, best shown in FIG. 10, which is designed to provide their intermittent connection with the tractor cable 3. Considering that the displacement direction of the mobile component 2 is that which is indicated by the arrows 41, the tongs 39a and 39b open as soon as the mobile components 2 reach the section $C_iC_2$ where the connection with the variation link 1 is effected. The mobile component 2 is then disconnected from the tractor cable 3 and follows the course of the variation links 1, passing through a deceleration zone D, a stationary or low speed zone PV, and an accelerating zone A as depicted in FIG. 9. Finally the mobile component reaches the second connecting section $C_3C_4$ where its tongs 39a and 39b close under the action of the tractor cable 3. The mobile component 2 may then enter the high speed zone GV along which it is connected with both the variation cable and the tractor cable 3.

In the transportation device 100", a single tractor cable 3, looped on itself, and a single variation cable 8 are used. The path of each one of these elements is spread away from the other at the end of the loop, thus defining, along the track of the transportation system, two high speed zones GV along the length of the loop of the tractor cable 3 and two stationary zones PV at the ends of the loop. Only one end zone is represented. The rule governing the speed of the mobile components 2 at the opposite end may be identical or different, depending on the path followed by the variation cable 8 and the mobile components attached thereto.

Figure 11:
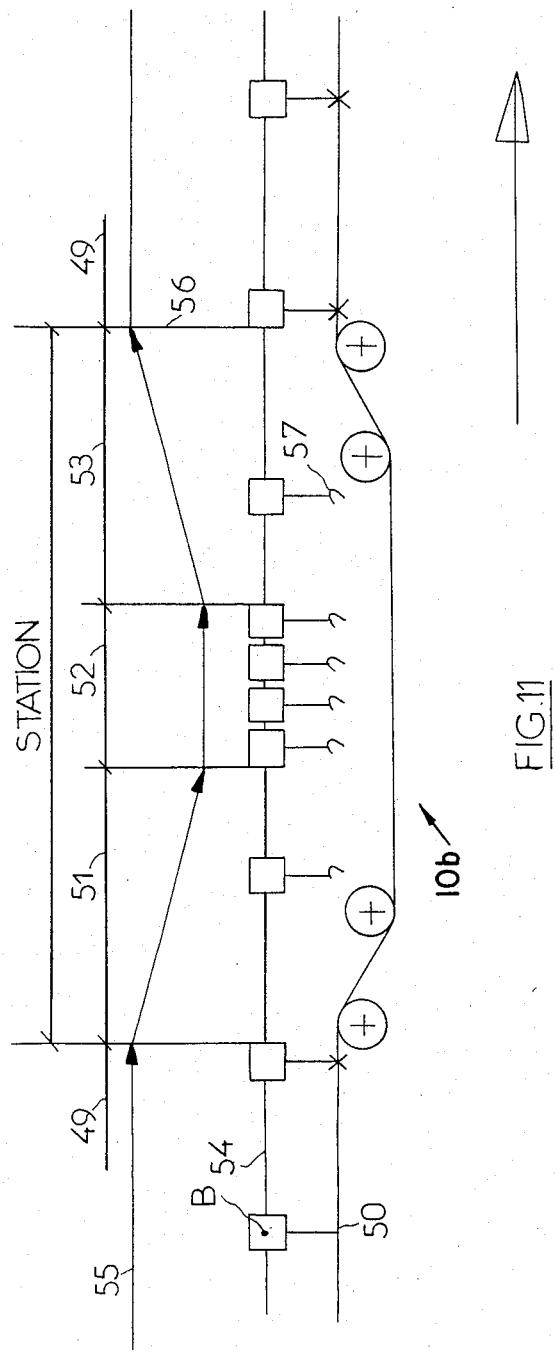
FIG. 11 is a partial schematic side view of a transportation device according to the present invention.

Referring now to FIG. 11, an alternate transportation device 106 is illustated. In the following description, it should be noted that the term "STATION" describes the non-driven zone covered by a mobile component, which is rigidly mounted with a bogie $B_i$, between the time when the bogie releases the tractor cable 50, and the time when it again engages the tractor cable. Between these two times, the bogie $B_i$ will have consecutively covered a deceleration zone 51, a low speed zone 52, and an accelerating zone 53. The high speed zones 49 obviously remain on either side of the station. A speed diagram 55 has been indicated in parallel with the path of the tractor cable 50 and the variation chain 54.

In the preceding section, rail and roller type systems have been described which allow for the coiling and uncoiling of the variation cable in order to achieve the predetermined speed rule for which the rails have been designed.

The types of regulating devices 33 governing the tension in the variation cable, and which have been described hereinabove, relate to a component which may be located external of the station. These systems can control the motors 4 of the tractor assembly.

The new type of regulating device 33 described hereinafter can operate within a station, without affecting the drive motors or the speed of these motors.

Such a regulating device 33 is illustrated in FIG. 12, with the speed diagram of the transportation device 106 depicted in FIG. 13. In this case, the regulating device 33 moves location 56 upstream in such a position as to connect the bogie $B_i$ with the tractor cable 50. The bogie $B_i$, therefore, catches the tractor cable 50 with its tongs 57, before reaching the end of the accelerating zone 53 where the control rails 58 unravel the variation cable of the portion of the variation chain 54 adjacent the bogie $B_i$.

The speed diagram 59 represents the speed variation obtained with the control rails 58 only. It will be appreciated that, as soon as the tongs 57 engage the tractor cable 50, the speed of the bogie $B_i$ is no longer subjected to the action of the control rails 58. The speed variation then follows the new speed diagram 60. This new speed diagram 60 represents a greater acceleration than that indicated by the speed diagram 59. The control rails 58 unravel a certain length of the variation chain 54 after reaching the location 56. A predetermined amount of slack appears in the section of the variation cable 8 separating the bogie $B_i$ from the bogie which immediately precedes it. This slack appears at the expense of the preexisting slack of the variation chain 54, at the level of the station considered. This operation, therefore, allows for a tightening of the variation chain 54 at this station.

Any known means may be used to sense the slack in the variation cable 54. It is possible, in particular, to note the synchronization of the bogies $B_i$ entering the station and those which leave it.

In order to monitor the time when the tongs 57 engage the tractor cable 50, it is also possible to control the position of one of the control rails 58 that induce the openings of the tongs 57. The tongs 47 remain closed when subjected only to the action of their return spring, not illustrated.

A simple combination of known devices will provide the desired monitoring system. The detecting of a delay at the time when a bogie $B_i$ leaves the station allows backing up the control rail 58 which keeps the tongs 57 open. The greater the delay, the greater the backing motion of the control rail 58. The earlier the bogie $B_i$ grabs the tractor cable 50, the more the variation chain 54 is tightened in the station concerned.

It is also clear that any slack detected in the variation chain 54 upon entering the station is immediately sensed, and that the monitoring device immediately corrects the condition. Therefore, a self-monitoring system is provided which operates gradually without affecting the speed of the drive systems of the tractor cable 50.

Figure 14:
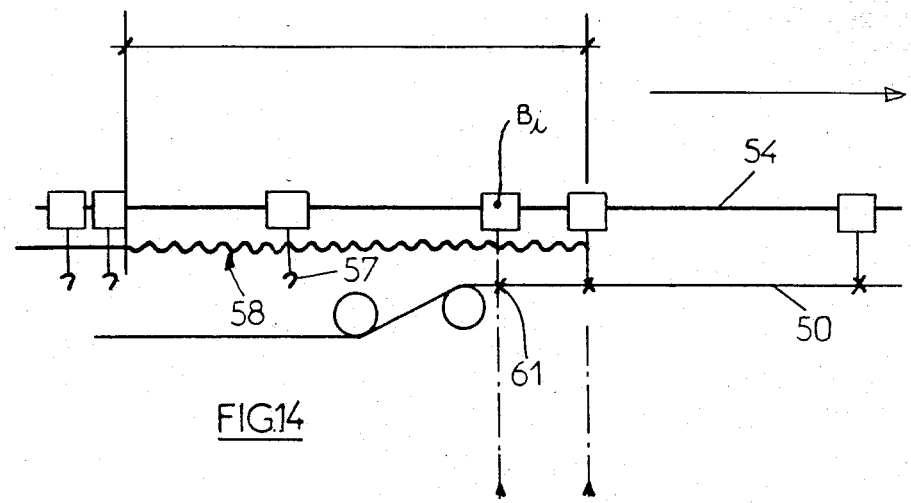
FIGS. 14 and 15 represent other partial side views of the transportation device according to other variations.

According to the variation illustrated in FIG. 14, it is desirable to design the transportation device 106' in such a manner that the tongs 57 could normally grab the tractor cable 50 at a preselected location 61, located upstream of the end of the unraveling control rails 58. The effective point of catch of the tractor cable 50 by the tongs 57 may then move on either side of the preselected location point 61. By allowing this displacement, a stationary slack transferring system is thus obtained, which gradually transfers the slack from one station to the next. Since each pair of tongs 57 can engage the tractor cable 50 downstream of the preselected location 61, it is possible to create slack in the tractor cable 50 within the station considered by preventing the loss of the respective slack controlling the closing of the tongs 57 at the preselected location 61.

Figure 15:
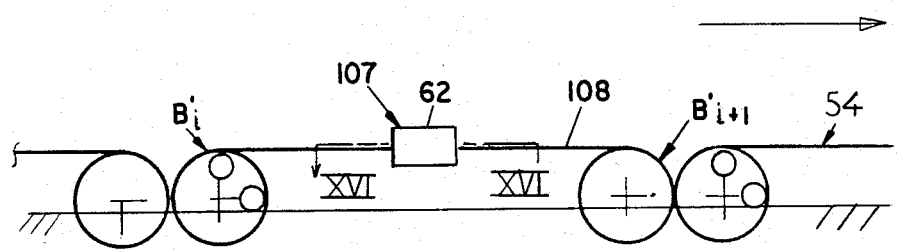
Figure 16:
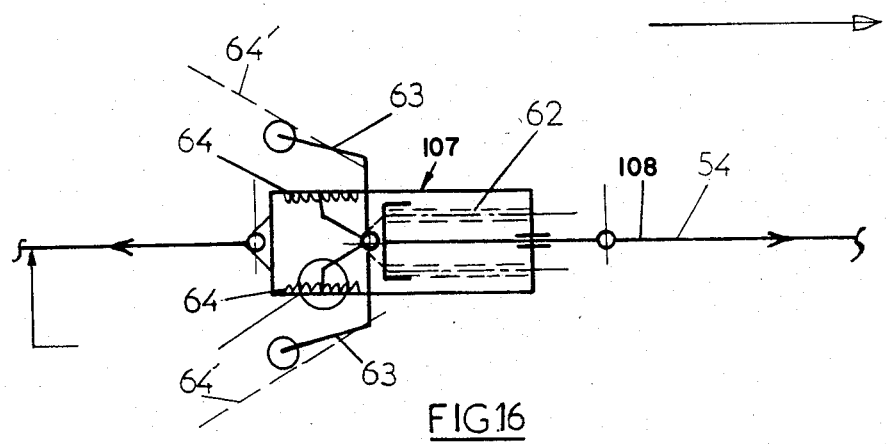
FIG. 16 is a sectional view taken along line XVI—XVI of FIG. 15.

According to another variation illustrated in FIGS. 15 and 16, the monitoring means consists of an elastic system 107 such as a spring 62 located on the portion of the variation cable 108 of the variation chain 54 which separates two consecutive bogies $B_i$ and $B_{i+1}$. It is desirable to initially subject the spring 62 to a predetermined force.

It will be appreciated that an excess of tension which is gradually accumulated in the station will cause a compression of the springs 62 in the low speed zone, as soon as the tension of the variation cable 54 exceeds the value of the predetermined force on the springs 62 at the locations.

It is possible to improve the elastic system 107 by coupling each spring 62 with two ratchets 63, as shown in FIG. 15, which can mesh with racks 64. When the ratchets 63 are subjected to the action of the spring 62, their respective active ends remain meshed with the racks 64 so as to lock the mechanism and prevent any release of the spring 62. When the free ends of the ratchets 63 are in contact with the opening rails 64', the ratchets 63 are brought away from the racks 64, so that the mechanism unlocks and releases the spring 62.

Therefore, the opening rails 64' are provided in the low speed zone of each station but are not provided in the reaccelerating zone. The ratchets 63 prevent the spring 62 from returning to its regular position whenever the tension of the variation cable 108 decreases and the speed increases. This operation introduces slack in the variation cable 108 in the affected station. The opening rails 64' are provided upstream of each station to release the ratchets 63 upon entering the decelerating zone. The slack which is given to the variation cable 108 in a given station is automatically compensated for by an increase in the variation cable, in the following or downstream station.

In the case where a continuous drift is encountered, due to a large slope existing in the interval between two stations, the above described monitoring device is less desirable than those previously described. The length correction cannot be accomplished quickly, given that the variation obtained is divided by the extreme speed ratio. The monitoring device of FIGS. 15 and 16 is desirable, however, whenever a slight, repeated drift is no longer encountered, and when instead a sudden force causes a detrimental delay to a bogie or a few bogies.

A specific example will assist in providing a better understanding of the elastic system 107. If a foreign object causes a delay of L meters on a bogie entering the station and $R=V/v$ represents the ratio between the high speed V of the high speed zone 49 and the low speed v of the low speed zone 52, the L meters delay of the bogie in the zone adjacent to the high speed zone will immediately extend the elastic system 107 located in the low speed zone 52 by L/R. Therefore, the sole excess of tension of the variation cable 108 wil represent the excess of compression of the elastic systems resulting in an extension equal to L/R, and the excess of tension will easily be compensated.

However, the normal condition will only be restored fraction by fraction of the L/R value upon each passage of the bogies.

According to another variation illustrated in FIGS. 17 through 19, the problem constituted by the excessive tension of the variation chain 54 can also be solved, not by modifying the local variations of the length of the variation cable 108, but by locally relieving the variation cable with a drive effort directly supplied by the tractor cable 50, through a friction mechanism.

This type of solution offers a great advantage in the case where a mechanical incident, such as the binding of a bearing or the penetration of a foreign object, causes a permanent breaking action on a given bogie. In this case, the breaking intensity is increased when the bogie starts decelerating upon entering the station. When the bogie reaches the low speed zone, the excessive amount of tension of the variation cable 108 will be multiplied by the ratio R of the high speed V and the low speed v.

Practically, each bogie includes two connecting elements for the tractor cable 3. The first connecting element is the one which couples the bogies to the tractor cable 50 in the high speed zones. This connection could consist of a pair of tongs, for example. The second connecting element is able to induce a friction type driving action with a variable degree of sliding. The intensity of the friction should be set wit reference to the excess amount of tension to be compensated, so that this compensation will be effected by an additional drive force provided by the tractor cable 50. The term friction is used in this case in its broadest sense. In the example illustrated in FIGS. 17 through 19 it is possible to obtain a system whic engages the tractor cable between two pulleys 65, with a variable amount of tension, or a gradual braking of the pulleys on a transmission shaft 66.

More precisely, each of the two pulleys 65 includes two half pulleys 65a and 65b, complementing each other, which are roughly identical and mounted in such a fashion as to rotate on the same transmission shaft 66 coupled with the bogie $B_i$ considered. The transmission shaft 66 is locked in rotation inside the bogie $B_i$. A spring 70, acting on the upper end of the transmission shaft 66, is provided to compress the stack of half pulleys 65a and 65b, as well as the friction discs 69 between the lower head 67 of the transmission shaft 66 and a bearing 68. The spring 70 is adjacent to a plate 71 supporting a roller 72 which may come in contact with side rails 73. An override device 74 coupled with a positioning mechanism of the side rails 73 and force sensors 75 positions the side rails 73 so as to balance the compression caused by the spring 70.

It is understood that without any abnormal excess of tension, the sensors 75 do not sense any effort of a sufficient intensity to cause the displacement of the side rails 73. The side rails 73 then remain low enough to release the half pulleys 65a and 65b. In contrast, in the case where an excessive amount of tension is noted in the variation cable 108, the side rails 73 rise to an extent so as to permit the spring 70 to cause a friction drive action on the slack.

It should be noted that the flanges of the pulleys 65 preferably include a crown 76. The meshing of the crowns 76 balances the friction forces transmitted by both of the pulleys 65.

According to a last example, illustrated in FIGS. 20 through 22, it is also possible to obtain a variation of the speed without displacing the side rails 77 controlling the closure of the tongs 57. Instead, in the example illustrated in FIGS. 12 through 14, the tension in the variation chain 54 is regulated by coupling the elements of the variation chain 54 with the tractor cable 50 using an adjustable speed. Therefore, the speed of the variation chains 54 should be preset by any known means, such as by the variation of the reel diameter for the bogies, the variation of the position of the stop pieces and/or of the control rails 78 which limit the unraveled length of the variation cable 108.

As shown in FIG. 22 all of these changes modify the rule of acceleration indicated on the speed diagram 59, either in a punctual fashion as shown on the speed diagram 79, or in a more continuous fashion, as indicated by the speed diagram 80.

The tension regulating device used for the variation link 1 according to the present invention leave the variation cable 108 unaffected by avoiding subjecting the variation cable 108 to excessive local tensions, and they also prevent any knocking in the drive force of the mobile components 2 particularly when each mobile component again engages the tractor cable 50.

The above described transportation devices and regulating devices totally protect the low speed zones from the excessive tension in the event of an incidental slippage of the tongs which creates a link consumption condition, that is the length of the available variation cable 108 becomes shorter than the length of the tractor cable 50 between the entry and the exit points of the stations.

The second part of the present invention provides for protecting the low speed zone from the excessive tensions that could result from a significant multiplication of the extreme speed ratio, an excessive friction or binding of a bearing, or a force caused by the hanging of the variation cable between two consecutive mobile components.

In this case, the present invention provides a system of protection which operates as follows. A decelerating mobile component should continuously pull on its upstream cable, but never on its downstream cable beyond a certain preset limit, whereas a decelerating mobile component usually pulls on its downstream cable, and never on its upstream cable beyond a certain preset limit.

The following examples illustrate the principle of operation described above, and are non-exhaustive.

Figure 23:
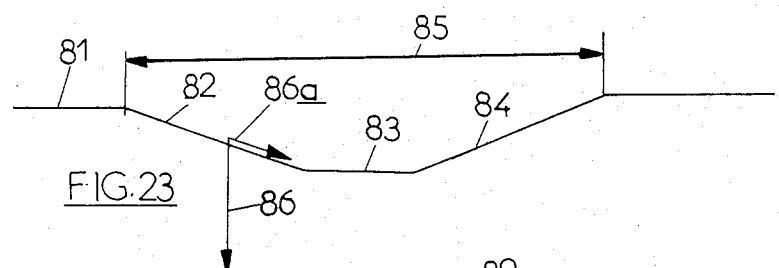
FIGS. 23 through 26 are other partial side views of the transportation device of the present invention according to other variations.

FIG. 23 shows a circuit portion including a high speed zone 81, a decelerating zone 82, a low speed zone 83 and an accelerating zone 84. The zones 82, 83 and 84 together constitute a non-driven station 85. In order to obtain the above described operation mode, the decelerating zone 82 has been designed downstream, whereas the accelerating zone 84 has been designed upstream.

When a mobile component is in the decelerating zone 82, the component of gravity force 86 obtained by projecting of that force onto the rolling plane is, indeed, a force 86a directed in such a fashion that it pulls the mobile component by its upstream cable, this traction relieving thereby the tension of the downstream cable. Without slope the tension of the downstream cable would have been multiplied in the low speed zone.

Figure 24:
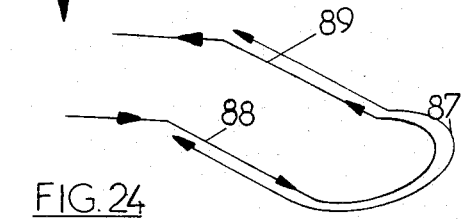

FIG. 24 shows the same operating principle but at the end of a closed circuit. The station 87 is located on a slanted terrain which puts the decelerating zone 88 downhill and the accelerating area 89 uphill.

Figure 25:
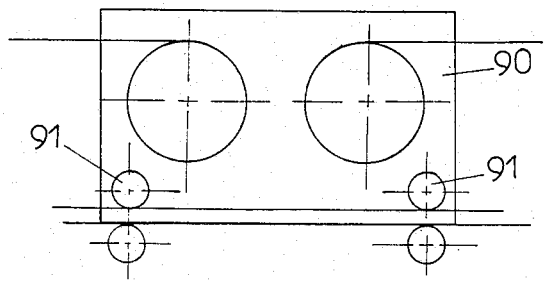

According to another example illustrated in FIG. 25 the inertia of the mobile components 90 may be increased either by direct increase of their mass, or indirectly by affecting at least one wheel of inertia bound in rotation with the rolling components 91 to each mobile component.

In this case, it is clear that in each decelerating area the kinetic energy of the mobile components or of the wheels will have a tendency to accelerate the mobile components by tensing their rear cable, the reverse phenomenon is observed in the accelerating zones.

Figure 26:
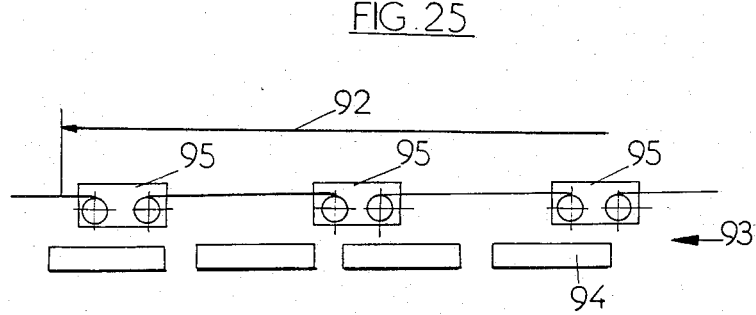

In the example illustrated in FIG. 26 a linear motor 93, including spools 94 in its fixed section, is provided all along the decelerating zones 92 or on a portion of these zones, whereas the armature is located in the mobile components 95.

It is understood that instead of using a linear electrical motor, it would also be possible to use any mechanical, hydraulic, pneumatic, magnetic, electrical or any other type of motor which could apply a force to the decelerating mobile components. This force should be directed in the same direction as the displacement and should be sufficient to at least compensate all accidental and incidental braking causes.

The above description is offered by way of example and not by way of limitation.

What is claimed as novel is as follows:

1. A funicular type transportation device comprising: stationary rail means defining a first continuous loop; a variation chain comprising a plurality of variation links of variable length, said plurality of variation links being interconnected with each other in a series which is looped back on itself, said variation chain being mounted to said stationary rail means such as to be movable about said first continuous loop;
variation link control means disposed in first predetermined locations relative to said stationary rail means, said variation link control means controlling the length of each variation link of said plurality of variation links in said first predetermined locations such that said variation link control means define a rule of speed for said plurality of variation links on said variation chain as said variation chain travels about said first continuous loop, said variation link control means defining at least one high speed zone of said first continuous loop;
tractor means disposed adjacent said at least one high speed zone of said first continuous loop, said tractor means comprising at least one cable forming a second continuous loop, a portion of said at least one cable being disposed adjacent said at least one high speed zone;
drive means driving said tractor means at a predetermined speed around said second continuous loop;
a plurality of mobile components spaced along said variation chain, each mobile component of said plurality of mobile components being interconnected with at least one variation link of said plurality of variation links, the spacing of adjacent mobile components of said plurality of mobile components along said variation chain being determined by the various lengths of said plurality of variation links, such that the instantaneous velocity of any one mobile component of said plurality of mobile components relative to an adjacent mobile component of said plurality of mobile components is determined by said rule of speed;
a plurality of controllably operable interconnection means for interconnecting said plurality of mobile components with said tractor means, each interconnection means of said plurality of controllably operable interconnection means being controllably operable for interconnecting an associated mobile component of said plurality of mobile components with said at least one cable such that said associated mobile component is driven by said at least one cable;
actuation means disposed in at least one second predetermined location relative to said stationary rail means, said at least one second predetermined location being at an upstream end of said at least one high speed zone, said actuation means being controllably operable for actuating each interconnection means of said plurality of controllably operable interconnection means when the associated mobile component associated therewith passes said at least one second predetermined location as said variation chain travels along said first continuous loop, such that said interconnection means of said associated mobile component interconnects said associated mobile component with said at least one cable as said associated mobile component passes said at least one second predetermined location;

deactuation means disposed in at least one third predetermined location relative to said stationary rail means, said at least one third predetermined location being located at a downstream end of said at least one high speed zone, said deactuation means being controllably operable for deactuating each interconnection means of said plurality of controllably operable interconnection means when said associated mobile component passes said at least one third predetermined location as said variation chain travels along said first continuous loop, such that said interconnection means of said associated mobile component disconnects said associated mobile component with said at least one cable as said associated mobile component passes said at least one third predetermined location;

sensor means measuring the force of said variation link control means on said variation chain; and control means responsive to said sensor means such as to control said drive means in a manner to maintain said force of said variation link control means on said variation chain below a predetermined maximum level.

tion chain below a predetermined maximum level.

2. A funicular type transportation device comprising:

stationary rail means defining a first continuous loop;

a variation chain comprising a plurality of variation links of variable length, said plurality of variation links being interconnected with each other in a series which is looped back on itself, said variation chain being mounted to said stationary rail means such as to be movable about said first continuous loop;

each of said plurality of variation links comprising an unraveling reel type link comprising:

a pair of spaced apart bogies;

a roller attached to each of said bogies; and a variation cable having a first end wound about the roller of one of said pair of spaced apart bogies and a second end wound about the roller of the other of said pair of spaced apart bogies;

variation link control means disposed in first predetermined locations relative to said stationary rail means, said variation link control means controlling the length of each variation link of said plurality of variation links in said first predetermined locations such that said variation link control means define a rule of speed for said plurality of variation links on said variation chain as said variation chain travels about said first continuous loop, said variation link control means defining at least one high speed zone of said first continuous loop, said variation link control means comprising:

ramp means disposed in said first predetermined locations; and follower means fixedly interconnected with one of said rollers, said follower means engaging said ramp means such as to rotate said one of said rollers and thereby vary the length of said variation link when said follower means moves by said ramp means as said variation chain travels about said first continuous loop;

tractor means disposed adjacent said at least one high speed zone of said first continuous loop, said tractor means comprising at least one cable forming a second continuous loop, a portion of said at least one cable being disposed adjacent said at least one high speed zone;

drive means driving said tractor means at a predetermined speed around said second continuous loop;

a plurality of mobile components spaced along said variation chain, each mobile component of said plurality of mobile components being interconnected with at least one variation link of said plurality of variation links, the spacing of adjacent mobile components of said plurality of mobile components along said variation chain being determined by the various lengths of said plurality of variation links, such that the instantaneous velocity of any one mobile component of said plurality of mobile components relative to an adjacent mobile component of said plurality of mobile components is determined by said rule of speed;

a plurality of controllably operable interconnection means for interconnecting said plurality of mobile components with said tractor means, each interconnection means of said plurality of controllably operable interconnection means being controllably operable for interconnecting an associated mobile component of said plurality of mobile components with said at least one cable such that said associated mobile component is driven by said at least one cable;

actuation means disposed in at least one second predetermined location relative to said stationary rail means, said at least one second predetermined location being at an upstream end of said at least one high speed zone, said actuation means being controllably operable for actuating each interconnection means of said plurality of controllably operable interconnection means when the associated mobile component associated therewith passes said at least one second predetermined location as said variation chain travels along said first continuous loop, such that said interconnection means of said associated mobile component interconnects said associated mobile component with said at least one cable as said associated mobile component passes said at least one second predetermined location;

deactuation means disposed in at least one third predetermined location relative to said stationary rail means, said at least one third predetermined location being located at a downstream end of said at least one high speed zone, said deactuation means being controllably operable for deactuating each interconnection means of said plurality of controllably operable interconnection means when said associated mobile component passes said at least one third predetermined location as said variation chain travels along said first continuous loop, such that said interconnection means of said associated mobile component disconnects said associated mobile component with said at least one cable as said associated mobile component passes said at least one third predetermined location;

sensor means measuring the force exerted by said follower means on said ramp means; and control means responsive to said sensor means such as to control said drive means in a manner to maintain the tension in said variation chain below a predetermined maximum level.

3. The funicular type transportation device of claim 2 wherein said stationary rail means comprises a pair of side rails, said pair of side rails being spaced apart and disposed at least partially around said first continuous loop.

4. The funicular type transportation device of claim 3 wherein each of said variation links comprises:
   four spaced-apart follower means, a first pair of said four spaced-apart follower means engaging a first side rail of said pair of side rails and a second pair of said four spaced-apart follower means engaging a second side rail of said pair of side rails; and
   a variation cable extending in a continuous loop about said variation link, said variation cable being slidably interconnected with each of said four spaced-apart follower means such that said variation cable interconnects said four spaced-apart follower means.

5. The funicular type transportation device of claim 4 wherein said variation link control means comprises said pair of side rails, said pair of side rails being formed such as to provide a first predetermined spacing therebetween in said at least one high speed zone and a varying predetermined spacing therebetween in the remaining zones of said first continuous loop, said variation cable acting to draw said first pair of said four spaced-apart follower means together and to draw said second pair of said four spaced-apart follower means together in response to an increase in the spacing between said pair of side rails.

6. The funicular type transportation device of claim 4 wherein:
   each of said variation links of said plurality of variation links further comprises cross-bars extending generally between said pair of side rails, each of said cross-bars having a first end reciprocably interconnected with one of said first pair of said four spaced-apart follower means, each of said cross-bars further having a second end opposite said first end, said second end being reciprocably interconnected with one of said second pair of said four spaced-apart follower means; and
   each interconnection means of said plurality of controllably operable interconnection means comprises gripping means interconnected with said at least one cable, said gripping means being selectively engageable with one of said cross-bars.

7. The funicular type transporation device of claim 2 wherein each of said plurality of controllably operable interconnection means comprises a friction type tong interconnected with said variation chain and selectively interconnected with tractor means.

8. The funicular type transportation device of claim 2 wherein each of said plurality of controllably operable interconnection means comprises a pair of lugs pivotally mounted to said tractor means, said pair of lugs being pivotable towards each other to engage said variation chain.

9. The funicular type transportation device of claim 2 wherein:
   said variation link control means defines a plurality of high speed zones, said at least one high speed zone being one of said plurality of high speed zones;
   said tractor means comprises a plurality of tractor cables, each of said plurality of tractor cables forming a continuous loop, said at least one tractor cable being one of said plurality of tractor cables, each of said plurality of tractor cables further being disposed adjacent one of said plurality of high speed zones;
   said plurality of controllably operable interconnection means are controllably operable to disconnect each of said mobile components with one of said plurality of tractor chains at a time; and
   said funicular type transportation device further comprises a plurality of said actuation means and deactuation means, one of said actuation means and one of said deactuation means being associated with each of said high speed zones such as to selectively interconnect those mobile components of said plurality of components which are disposed within said high speed zones with the tractor cable of said plurality of tractor cables which is disposed adjacent thereto.

10. The funicular type transportation device of claim 9 wherein said control means is responsive to the tension in said variation cable between said adjacent tractor cables of said plurality of tractor cables, said control means symmetrically regulating the speed of said adjacent tractor cables to reduce said tension.

11. The funicular type transportation device of claim 2 further comprising emergency braking means and starting means, the force and the tension caused by said emergency braking means and said starting means being almost totally absorbed by said tractor means, the various components of the funicular transportation device being interchangeable and dimensioned in direct proportion to the tensions to which they are subjected in the zones of said first continuous loop remote from said at least one high speed zone.

12. The funicular type transportation device of claim 2 wherein said tractor means comprises only one tractor cable, the path followed by said variation chain being oriented such as to diverge from the path of said only one tractor cable at the opposite ends of said first continuous loop, so as to define two speed variation zones at the ends of the path followed by the plurality of mobile components of said funicular transportation device about said first continuous loop and further so as to define two high speed zones therebetween.

* * * * *

UNITED STATES PATENT AND TRADEMARK OFFICE
CERTIFICATE OF CORRECTION

PATENT NO. : 4,508,205
DATED : April 2, 1985
INVENTOR(S) : Michel Aulagner, et al.

It is certified that error appears in the above-identified patent and that said Letters Patent is hereby corrected as shown below:

Column 8, line 62, delete "drive" and insert ---- device ----.

Column 9, line 5, delete "$R_{i-a}$" and insert ---- $R_{i-1}$ ----.

Column 10, line 52, after "illustrate" insert ---- still ----.

Column 13, line 45, delete "wil" and insert ---- will ----.

Column 14, line 6, delete "wit" and insert ---- with ----.

Column 14, line 12, delete "whic" and insert ---- which ----.

In the Claims

Column 17, line 25, delete in it entirety "tion chain below a predetermined maximum level."

Column 20, line 16, delete "disconnect" and insert ---- interconnect ----.

Signed and Sealed this

Thirteenth Day of August 1985

[SEAL]

Attest:

DONALD J. QUIGG

Attesting Officer    Acting Commissioner of Patents and Trademarks